(12) United States Patent
LaFreniere et al.

(10) Patent No.: US 9,032,437 B2
(45) Date of Patent: *May 12, 2015

(54) SYSTEM AND METHOD FOR PROVIDING ENHANCED ENTERTAINMENT DATA ON A SET TOP BOX

(71) Applicant: CenturyLink Intellectual Property LLC, Denver, CO (US)

(72) Inventors: Gary W. LaFreniere, Olathe, KS (US); David Emerson, Overland Park, KS (US); Kelsyn Rooks, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,564

(22) Filed: Aug. 7, 2013

(65) Prior Publication Data

US 2013/0326550 A1   Dec. 5, 2013

Related U.S. Application Data

(63) Continuation of application No. 12/684,616, filed on Jan. 8, 2010, now Pat. No. 8,510,775.

(51) Int. Cl.
*G06F 3/00* (2006.01)
*G06F 13/00* (2006.01)
(Continued)

(52) U.S. Cl.
CPC ..... *H04N 21/25435* (2013.01); *H04N 5/44543* (2013.01); *H04N 21/4185* (2013.01);
(Continued)

(58) Field of Classification Search
CPC .......... H04N 21/44222; H04N 21/47815; H04N 21/6581
USPC ............. 725/1, 4–5, 8, 32, 35–40, 43–45, 47, 725/52–53, 41
See application file for complete search history.

(56) References Cited

U.S. PATENT DOCUMENTS 7,093,272 B1   8/2006   Shah-Nazaroff et al.
8,112,070 B2 *   2/2012   Huang ........................ 455/414.1
(Continued)

OTHER PUBLICATIONS

U.S. Appl. No. 12/201,397; Final Rejection dated Feb. 4, 2014; 19 pages.

(Continued)

*Primary Examiner* — Pankaj Kumar
*Assistant Examiner* — Alazar Tilahun
(74) *Attorney, Agent, or Firm* — Swanson & Bratschun, L.L.C.

(57) ABSTRACT

Embodiments of the disclosed invention include an apparatus, method, and computer program product for providing enhanced entertainment data. For instance, in one embodiment, a computer implemented method for providing enhanced entertainment data includes receiving a request for additional information related to a selected show and displaying the additional information, which includes a list of selectable merchandise associated with the selected show, in response to the request. In one embodiment, the method presents information related to a selected merchandise and an option for a user to purchase the selected merchandise. The method may further include retrieving a billing address associated with a subscriber account associated with the user in response to receiving a purchase request for the selected merchandise and placing an order for the selected merchandise using the billing address. The method may also include billing the order as part of a monthly service charge to the user.

15 Claims, 6 Drawing Sheets

(51) Int. Cl.

| | |
|---|---|
| *H04N 5/445* | (2011.01) |
| *H04N 21/2543* | (2011.01) |
| *H04N 21/4185* | (2011.01) |
| *H04N 21/45* | (2011.01) |
| *H04N 21/462* | (2011.01) |
| *H04N 21/4722* | (2011.01) |
| *H04N 21/478* | (2011.01) |
| *H04N 21/81* | (2011.01) |
| *H04N 21/8549* | (2011.01) |
| *H04N 21/475* | (2011.01) |

(52) U.S. Cl.
CPC ....... *H04N21/4532* (2013.01); *H04N 21/4622* (2013.01); *H04N 21/4722* (2013.01); *H04N 21/4755* (2013.01); *H04N 21/47815* (2013.01); *H04N 21/812* (2013.01); *H04N 21/8133* (2013.01); *H04N 21/8549* (2013.01)

(56) References Cited

U.S. PATENT DOCUMENTS

| | | |
|---|---|---|
| 8,510,775 B2 | 8/2013 | Lafreniere et al. |
| 2002/0010932 A1 | 1/2002 | Nguyen et al. |
| 2002/0056088 A1* | 5/2002 | Silva et al. .......... 725/9 |
| 2003/0056218 A1 | 3/2003 | Wingard et al. |
| 2003/0193519 A1 | 10/2003 | Hayes et al. |
| 2003/0233656 A1* | 12/2003 | Sie et al. .......... 725/46 |
| 2004/0187154 A1* | 9/2004 | Wasilewski .......... 725/60 |
| 2005/0289630 A1 | 12/2005 | Andrews et al. |
| 2006/0200842 A1 | 9/2006 | Chapman et al. |
| 2007/0162935 A1 | 7/2007 | Matsutani |
| 2008/0005764 A1 | 1/2008 | Arling et al. |
| 2008/0022300 A1 | 1/2008 | Angiolillo et al. |
| 2008/0092189 A1 | 4/2008 | Baker et al. |
| 2008/0168503 A1 | 7/2008 | Sparrell |
| 2008/0178221 A1* | 7/2008 | Schein et al. .......... 725/42 |
| 2008/0276278 A1 | 11/2008 | Krieger et al. |
| 2009/0150808 A1* | 6/2009 | Aldrey et al. .......... 715/764 |
| 2010/0058416 A1 | 3/2010 | LaFreniere et al. |
| 2010/0083321 A1* | 4/2010 | Schreiber .......... 725/87 |
| 2011/0173659 A1 | 7/2011 | Lafreniere et al. |

OTHER PUBLICATIONS

U.S. Appl. No. 12/201,397; Final Rejection dated Jun. 28, 2013; 20 pages.

U.S. Appl. No. 12/201,397; Final Rejection dated Dec. 20, 2011; 22 pages.

U.S. Appl. No. 12/201,397; Non-Final Rejection dated Apr. 25, 2013; 17 pages.

U.S. Appl. No. 12/201,397; Non-Final Rejection dated Jul. 20, 2011; 25 pages.

U.S. Appl. No. 12/201,397; Non-Final Rejection dated Dec. 18, 2013; 21 pages.

U.S. Appl. No. 12/684,616; Final Rejection dated Jan. 31, 2013; 1 pages.

U.S. Appl. No. 12/684,616; Final Rejection dated Jul. 12, 2012; 20 pages.

U.S. Appl. No. 12/684,616; Issue Notification dated Jul. 25, 2013; 1 page.

U.S. Appl. No. 12/684,616; Non-Final Rejection dated Mar. 29, 2012; 18 pages.

U.S. Appl. No. 12/684,616; Non-Final Rejection dated Oct. 16, 2012; 20 pages.

U.S. Appl. No. 12/684,616; Notice of Allowance dated Apr. 12, 2013; 14 pages.

U.S. Appl. No. 12/201,397; Final Rejection dated Jan. 16, 2015; 23 pages.

* cited by examiner

Information About Show

307

Display Cast Members

302
Show X Playing or
Selection of Show X on EPG

Cast Members of Show X

306

John Doe stars as Character A
310 — Jane Doe stars as Character B
John Smith stars as Character C
Mary Jones stars as Character D

308

302
Show X Playing or
Selection of Show X on EPG

320   Jane Doe   Add To Favorites

Biographical information ....

322   324   332   340

Starred in         Upcoming Releases   Merchandise
Show A    Get Info   New Movie          JDoe Perfume — 342
Show B    VOD       326                 JDoe Clothing — 344
Show C    DVD       328  334
                    330

302
Show X Playing or
Selection of Show X on EPG

SYSTEM AND METHOD FOR PROVIDING ENHANCED ENTERTAINMENT DATA ON A SET TOP BOX

CROSS REFERENCE TO RELATED APPLICATIONS

This application is a Continuation of U.S. patent application Ser. No. 12/684,616 filed on Jan. 8, 2010 entitled SYSTEM AND METHOD FOR PROVIDING ENHANCED ENTERTAINMENT DATA ON A SET TOP BOX the entire teachings of which are incorporated herein.

BACKGROUND OF THE INVENTION

Websites such as "The Internet Movie Database" (IMDB) enables users to retrieve information online relating to shows, cast members, production crew personnel, video games, and most recently, fictional characters featured in visual entertainment media. The IMDB website consists of one of the largest accumulations of data about films, television programs, direct-to-video products, and video games, reaching back to each medium's respective beginning. In many cases, the information goes beyond simple title and crew credit, but also includes data on uncredited personnel, production and distribution companies, plot summaries, memorable quotes, awards, reviews, box office performance, filming locations, technical specs, promotional content, trivia, and links to official and other websites. Furthermore, the IMDB tracks titles in production, including major announced projects still in development.

The database also houses filmographies for cast and crew members identified in listed titles. Filmographies include biographical details, awards listings, external links, and information about other professional work not covered by title entries in the database such as theatrical and commercial advertising appearances.

However, currently, this type of information is not readily available to a user while viewing a television program and/or while channel surfing an electronic programming guide on a set top box. Accordingly, certain of the disclosed embodiments provide a system and method for providing enhanced entertainment data about a television program and/or actor to a user via a set top box.

SUMMARY

Embodiments of the disclosed invention include an apparatus, method, and computer program product for providing, among other things, enhanced entertainment data about a television program and/or a cast member of a television program to a user via a middleware device. For example, in one embodiment, a computer implemented method for providing enhanced entertainment data includes receiving, at a set top box, a request for additional information related to a selected show. The method displays the additional information, which includes a list of selectable merchandise associated with the selected show. In response to receiving a user selection of one of the selectable merchandise, the method presents information related to a selected merchandise and an option for a user to purchase the selected merchandise. In one embodiment, the method further includes retrieving a billing address associated with a subscriber account associated with the user in response to receiving a purchase request for the selected merchandise and placing an order for the selected merchandise using the billing address. The method may further include billing the order as part of a monthly service charge to the user.

In another embodiment, a set top box is disclosed for providing enhanced entertainment data about a television program and/or actor. The set top box comprises a communication interface for receiving media content from a content provider; an input/output interface for outputting the media content to a display device; a memory component for storing computer executable instructions; a processing unit for executing the computer executable instructions to receive a request for additional information related to a selected show and display the additional information, which includes a list of selectable merchandise associated with the selected show. The processing unit further executes the computer executable instructions to present information related to a selected merchandise and an option for a user to purchase the selected merchandise. In certain embodiments, the processing unit may also execute the computer executable instructions to retrieve a billing address associated with a subscriber account associated with the user in response to receiving a purchase request for the selected merchandise and place an order for the selected merchandise using the billing address. Further, in some embodiments, the processing unit may execute the computer executable instructions to bill the order as part of a monthly service charge to the user.

Still, in another embodiment, a non-transitory computer-readable storage medium is disclosed having an executable program stored thereon, wherein the program includes computer executable instructions that when executed causes one or more machines to perform operations that include receiving a request for additional information related to a selected show; displaying the additional information, wherein the additional information includes a list of selectable merchandise associated with the selected show; presenting information related to a selected merchandise and an option for a user to purchase the selected merchandise in response to receiving a user selection of one of the selectable merchandise; retrieving a billing address associated with a subscriber account associated with the user in response to receiving a purchase request for the selected merchandise; placing an order for the selected merchandise using the billing address; and billing the order as part of a monthly service charge to the user.

Other additional embodiments and advantages of the disclosed embodiments are further described in the corresponding figures and detailed description of this disclosure.

BRIEF DESCRIPTION OF THE DRAWINGS

Illustrative embodiments of the present invention are described in detail below with reference to the attached figures, which are incorporated by reference herein and wherein:

FIGS. 3A-3C illustrates an embodiment of a series of user interfaces for enabling a user to retrieve enhanced entertainment data about a television program and/or a cast member in accordance with certain embodiments of the invention;

DETAILED DESCRIPTION

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
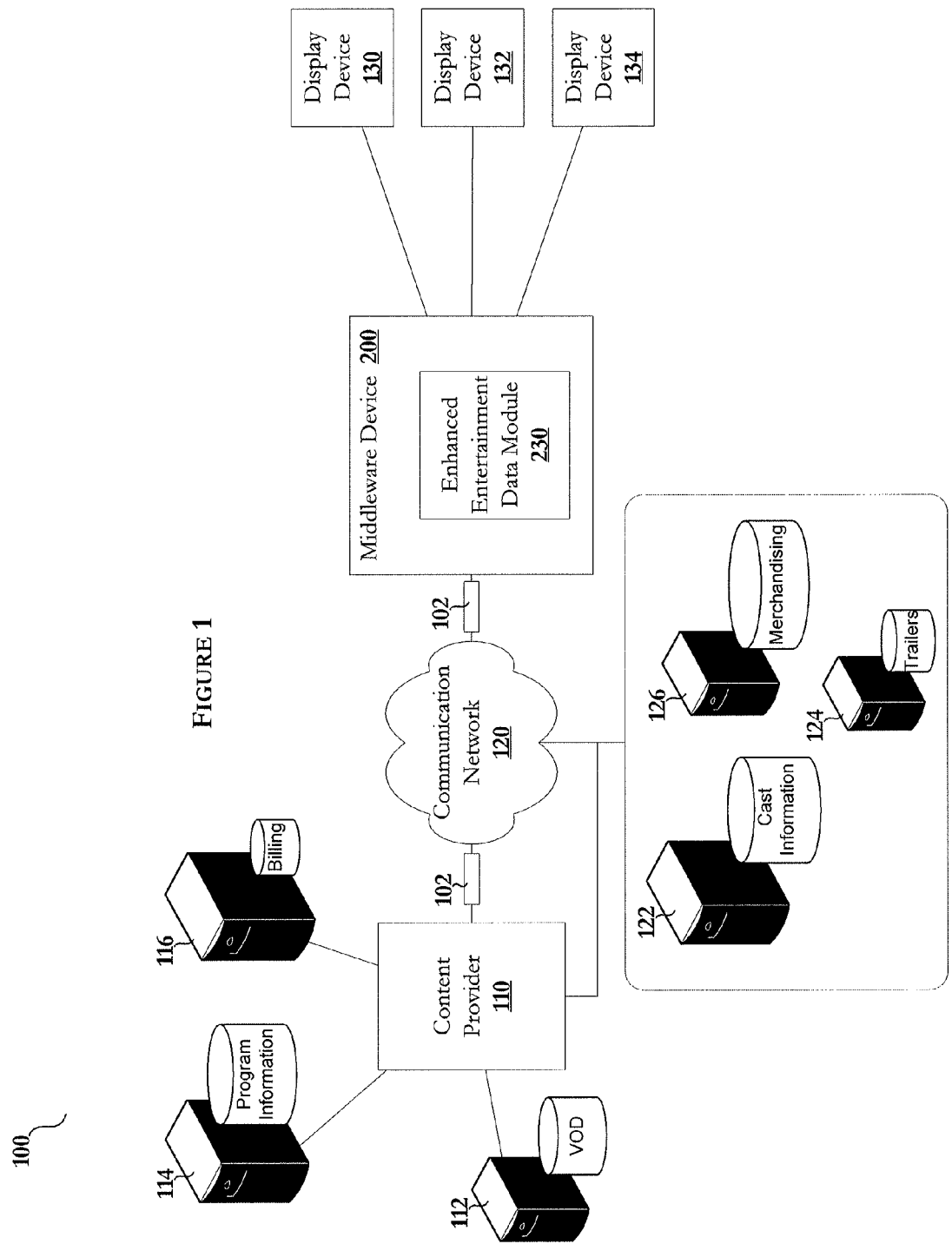
FIG. 1 depicts an embodiment of a network environment in which the illustrative embodiments may be implemented.

FIG. 1 depicts an embodiment of a network environment 100 in which the illustrative embodiments may be implemented. In the depicted embodiment, a content provider 110 transmits media content 102 to a middleware device 200 via communication network 120. Content provider 110 may be, but is not limited to, a cable, satellite, Internet Protocol Television (IPTV)/Internet television provider, and/or an Internet service provider. In some embodiments, content provider 110 may include one or more cable head ends for distributing media content to subscribers. In addition, content provider 110 may include and/or communicate with one or more data processing systems, such as, but not limited to, a video on demand database system 112 that stores media content, a program information database system 114 that contains programming data such as, but not limited to, an electronic programming guide, and a billing database system 116 that stores subscriber information for charging consumers for the services provided by content provider 110.

In some embodiments, communication network 120 may include, but is not limited to, one or more coaxial cable networks, fiber-optic networks, and/or satellite networks. In addition, in certain embodiments, communication network 120 may also include twisted pair networks and/or one or more IP networks, such as, but not limited to, the Internet, for providing IPTV/Internet cable television-type services and/or other related services.

Media content 102 may include audio and video content, such as, but not limited to, a television program. In some embodiments, media content 102 may include additional information, such as, but not limited to, an electronic programming guide and/or other information associated with the transmitted audio and video content. In addition, in some embodiments, media content 102 may include any type of data, such as, but not limited to, data files for updating an electronic programming guide and/or other functions/components of middleware device 200.

Middleware device 200 may be any type of device capable of distributing media content 102 to one or more display devices. For instance, in some embodiments, middleware device 200 may be, but is not limited to, a set-top box, a digital video recorder, a personal computer, and/or a router. In certain embodiments, middleware device 200 may include one or more components for decoding media content 102. For example, as will be further described, in some embodiments, middleware device 200 may include one or more cable tuners for decoding media content 102 and for providing the decoded media content to one or more display devices, such as, but not limited to, display device 130, display device 132, and display device 134. Display device 130, display device 132, and display device 134 may be any type of electronic device capable of displaying media content 102 to a user.

In accordance with certain embodiments, middleware device 200 may include an enhanced entertainment data module 230 for retrieving and displaying enhanced entertainment data about a television program/show and/or a cast member of a television program in accordance with the disclosed embodiments. As referenced herein, the terms television program and show are used interchangeably to mean any media content that is intended to be viewed by a user. As will be further described, in one embodiment, middleware device 200 may retrieve enhanced entertainment data from one or more remote sources via communication network 120. For example, middleware device 200 may communicate with a cast information database system 122 via communication network 120 to retrieve cast member information relating to a selected television program. In addition, in some embodiments, middleware device 200 may retrieve and display additional information for a particular cast member. For instance, in some embodiments, a movie trailer starring the selected cast member may be retrieved from a movie trailers database system 124. Further, in some embodiments, middleware device 200 may retrieve, display, and enable a viewer to purchase merchandise (e.g., clothing, perfume, movies, etc.) associated with a selected program and/or cast member.

Alternatively, in some embodiments, middleware device 200 may transmit a request for enhanced entertainment data to content provider 110. In these embodiments, content provider 110 may retrieve the requested enhanced entertainment data from one or more, local or remote, data processing systems, such as, but not limited to, cast information database system 122, movie trailers database system 124, and/or a merchandising database system 126. Content provider 110 then transmits the requested enhanced entertainment data to middleware device 200.

Additionally, in some embodiments, content provider 110 may transmit enhanced entertainment data to middleware device 200 in conjunction with transmitting media content 102 to middleware device 200 without middleware device 200 having to request the enhanced entertainment data. Alternatively, in certain embodiments, content provider 110 may transmit the enhanced entertainment data at periodic intervals. For example, content provider 110 may transmit the enhanced entertainment data at 2 AM daily and/or when transmitting updates for an electronic programming guide. Still, in other embodiments, content provider 110 may transmit enhanced entertainment data to middleware device 200 during low peak traffic times, including, but not limited to, when middleware device 200 is currently not displaying a media program. In these embodiments, middleware device 200 may store the enhanced entertainment data locally on a data storage unit. In response to receiving a user request for enhanced entertainment data relating to a particular television program and/or cast member, middleware device 200 retrieves the enhanced entertainment data from the local data storage unit and presents the enhanced entertainment data to the user. In certain embodiments, middleware device 200 automatically deletes locally stored enhanced entertainment data for a television program after its scheduled aired time.

Figure 2:
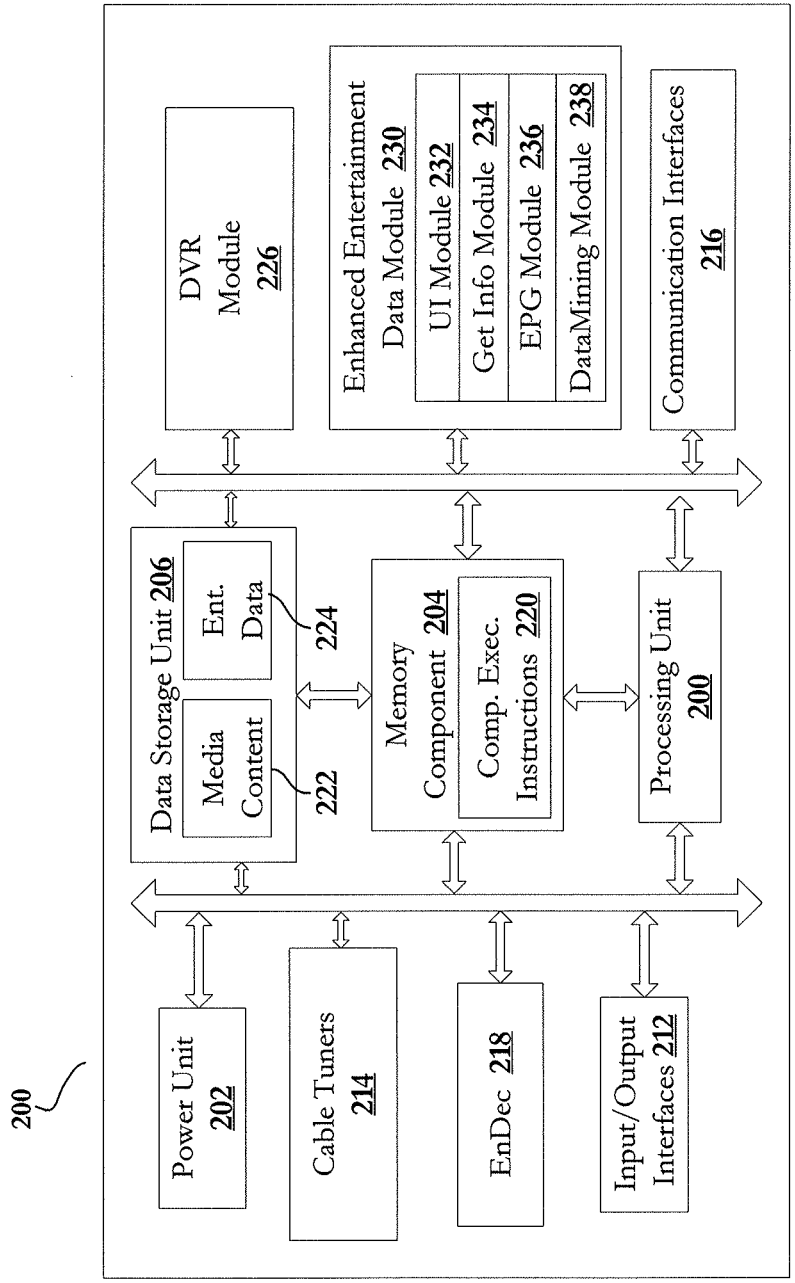
FIG. 2 illustrates a conceptual block diagram of a middleware device in accordance with certain embodiments of the invention.

FIG. 2 illustrates an embodiment of middleware device 200 in accordance with certain embodiments of the invention. In the depicted embodiment, middleware device 200 comprises, among other components, a processing unit 200, a power unit 202, a memory component 204, a data storage unit 206, and a set of communication interfaces 216. In one embodiment, power unit 202 converts the input power from an AC adaptor to run various components of middleware device 200. In addition, in some embodiments, power unit 202 may include an internal power source, such as, but not limited to, a battery component.

Processing unit 200 may comprise of one or more microprocessors for executing computer usable program code/instructions for displaying enhanced entertainment data for a selected television program. For example, in one embodiment, processing unit 200 executes computer executable instructions 220 stored in memory component 204 for retrieving enhanced entertainment data with regard to a particular television program from one or more remote sources and/or from local data storage unit 206. Data storage unit 206 may be any type of non-volatile memory, such as, but not limited to, one or more hard disk drives. In some embodiments, data storage unit 206 may be an external hard drive and/or flash memory, such as, but not limited to, an SD (Secure Digital) card, or USB flash drive. In addition, in some embodiments, data storage unit 206 may store recorded media content 222 in addition to enhanced entertainment data 224.

In accordance with the disclosed embodiments, middleware device 200 includes a set of communication interfaces 216 for receiving media content 102 from content provider 110. In some embodiments, communication interfaces 216 may include, but is not limited to, a coaxial cable connection, an Ethernet port, and/or a telephone line interface for connecting middleware device 200 to communication network 120. In addition, communication interfaces 216 may be utilize to receive, retrieve, and/or request enhanced entertainment data for one or more television programs.

In addition, middleware device 200 may include a set of input/output interfaces 212 for connecting middleware device 200 to one or more display devices. For example, in one embodiment, input/output interfaces 212 may include, but is not limited to, one or more coaxial cable connections, audio/video components connections, digital visual interfaces (DVI), S-video connections, composite video connections, and/or high-definition multimedia interfaces (HDMI). Additionally, in some embodiments, input/output interfaces 212 may include other data communication interfaces, such as, but not limited to, a 1394 interface and/or a universal serial bus (USB) interface. Middleware device 200 may include other components, such as, but not limited to, one or more cable tuners 214 for receiving and extracting the contents of media content 102 and one or more encoders/decoders (EnDecs) 218 for encoding/decoding data packets into one or more formats. In certain embodiments, middleware device 200 may include a digital video recorder (DVR) module 226 for managing the recording of one or more media content files and for playback of stored media content files 222.

As stated above, in accordance with one embodiment, middleware device 200 includes enhanced entertainment data module 230 for retrieving and displaying enhanced entertainment data about a television program and/or a cast member of a television program. In one embodiment, enhanced entertainment data module 230 may include one or more sub-modules, such as, but not limited to, user interface module 232, get info module 234, electronic programming guide module 236, and data mining module 238. The sub-modules may include executable instructions and/or specific hardware components for performing one or more tasks. For instance, in one embodiment, enhanced entertainment data module 230 may include executable instructions for receiving a user-request for enhanced entertainment data for a television program while the user is viewing the television program. Enhanced entertainment data module 230 may pass the title of television program or any other identifier to get info module 234 to retrieve the enhanced entertainment data for the particular television program. In certain embodiments, get info module 234 may attempt to retrieve the enhanced entertainment data from local data storage unit 206 if available. In other embodiments, get info module 234 may generate a request for enhanced entertainment data for the particular television program and transmit the request to one or more remote sources, such as, but not limited to, content provider 110 and/or program information database system 114.

In response to receiving and/or retrieving the enhanced entertainment data for the television program, enhanced entertainment data module 230 passes the enhanced entertainment data to user interface module 232 for generating a user interface that includes the enhanced entertainment information about the selected television program. In one embodiment, the generated user interface is displayed on top of the displayed television program. In these embodiments, the user interface may be semi-transparent to enable to a user to continue to view the displayed television program while viewing the enhanced entertainment information about the selected television program. Alternatively, in some embodiments, the generated user interface may be displayed in a particular area of a display that does not interfere with viewing of the displayed television program. Further, in some embodiments, the generated user interface may include one or more selectable options for presenting additional information. For example, in one embodiment, the generated user interface may include an option for retrieving a cast list containing the cast members associated with the displayed television program. In certain embodiments, the generated user interface may include one or more cast list options, such as, but not limited to, a partial cast list option (e.g., the main characters) and/or for a full cast list option (e.g., all characters, director information, crew members, etc.). Alternatively, in some embodiments, a user may configure a set of user preferences that specifies whether to retrieve/display a partial cast list or a full cast list.

In addition, in some embodiments, the displayed cast list includes individually selectable cast members for retrieving/displaying additional information about a selected cast member. In some embodiments, only cast members that have additional information relating to them are selectable. In other embodiments, all cast members are individually selectable. In these embodiments, if additional information relating to a selected cast member is not available, then enhanced entertainment data module 230 will indicate that no additional information is available for the selected cast member. In response to receiving a request for additional information relating to a selected cast member, enhanced entertainment data module 230 passes an identifier, such as, but not limited to, an actor's name and/or a number associated with the selected cast member, to get info module 234 for retrieving the additional information relating to the selected cast member. Again, get info module 234 may retrieve the additional information locally if available or may request the additional information from one or more remote sources. The retrieved information is passed to user interface module 232 for generating a user interface for displaying the additional information relating to the selected cast member.

In one embodiment, the user interface for displaying the additional information relating to the selected cast member may include biographical information about the selected cast member. In addition, the user interface may include a selectable list of films/programs in which the selected cast member is associated with. In some embodiments, the user interface may include an option for presenting additional information about a particular film/program in the selectable list of films. The additional information may be in the form of textual information and/or graphical information, such as, but not limited to, still images and/or video images. In addition, in some embodiments, the user interface may include an option to request viewing of a particular film/program in the selectable list of films (i.e., a video on demand option) and/or an option to purchase a hard copy of a particular film/program in the selectable list of films. For example, in one embodiment, if a user selects the option to purchase a hard copy of a film/program, enhanced entertainment data module 230 passes the request onto content provider 110 and/or a third party provider for fulfilling the request. Content provider 110 may automatically ship the hard copy of the requested film/program to a user's service/billing address and add the costs of the hard copy of the requested film/program to a user's monthly service bill. Alternatively, in some embodiments, the purchase cost may be automatically billed to a stored credit card associated with the user. If the user selects the video on demand option, middleware device 200 transmits the request to one or more remotes sources, such as, but not limited to, content provider 110. In response to receiving the requested show, middleware device 200 presents the requested show to the display device.

In addition, in some embodiments, the user interface may include upcoming and/or current theatrical releases in which the selected cast member is associated with. In certain embodiments, the user interface may include an option for retrieving additional information about a theatrical release. For example, in some embodiments, enhanced entertainment data module 230 may retrieve and present a movie trailer associated with a selected theatrical release. Additionally, in certain embodiments, a user may view show times and purchase tickets for a theatrical release at one or more local theaters. A user's location may be determined automatically based on a user's service address and/or a user-specified preference setting. Further, in some embodiments, the user interface may include an option for the user to view additional information and/or purchase merchandise associated with a selected show and/or cast member.

In some embodiments, the user interface may include an option for adding a selected cast member to a favorites list. For example, in one embodiment, if enhanced entertainment data module 230 receives a request to add a selected cast member to a favorites list, enhanced entertainment data module 230 passes the selected cast member identifier to electronic programming guide module 236. Electronic programming guide module 236 includes executable instructions for monitoring and searching an electronic programming guide of scheduled programs for television programs in which the selected cast member is associated with. In some embodiments, electronic programming guide module 236 may generate/update a favorite's electronic programming guide to include television programs in which the selected cast member is associated with. In other embodiments, electronic programming guide module 236 may highlight, or indicate in some other manner, television programs in which the selected cast member is associated with in a general electronic programming guide. In some embodiments, enhanced entertainment data module 230 may present an option for enabling the user to schedule recording of a future scheduled program in which the selected cast member is associated with.

In addition, in some embodiments, electronic programming guide module 236 may include computer executable instructions for enabling a user to request enhanced entertainment data for a television program while the user is viewing the electronic programming guide. For example, in one embodiment, the electronic programming guide may include, among other things, an option for a user to request enhanced entertainment data for a highlighted/selected channel on the electronic programming guide. The option may be displayed as part of the electronic programming guide and/or may appear in response to receiving a user-request (e.g., the option may be part of a menu that appears in response to the user pushing a menu button on a remote control device associated with middleware device 200).

In some embodiments, enhanced entertainment data module 230 may include data mining module 238 for monitoring, identifying, and logging information associated with a user's watching habits and a user's interaction with enhanced entertainment data module 230. For example, data mining module 238 may include computer executable instructions for identifying the types of programs/shows a user watches, the time of day that a user watches these programs, whether the programs are being viewed as a recording or as a live scheduled program, identifying cast members and the types of cast members that a user retrieves additional information on (e.g., directors, main characters, etc.), and the types of purchases made using enhanced entertainment data module 230. This information may be sent to content provider 110 and/or other parties to determine viewing habits and/or may be used to target specific services and/or products to the user.

FIGS. 3A-3C illustrates an embodiment of a series of user interfaces for enabling a user to retrieve enhanced entertainment data about a television program and/or an actor in accordance with one embodiment of the invention. Beginning with FIG. 3A, a display screen 300 is depicted. In one embodiment, display screen 300 displays a television program of a particular channel in a viewing area 302. Alternatively, in some embodiments, display screen 300 may display an electronic programming guide in viewing area 302. In one embodiment, in response to receiving a user request for additional information about a currently displayed television program and/or a television program displayed on the electronic programming guide, a user interface window 304 is presented that provides additional information about the requested television program. In one embodiment, the additional information includes a cast list containing individually selectable cast members. In certain embodiments, user interface window 304 may be scrollable using a remote control device for enabling a user to view all of the additional information. Alternatively, in other embodiments, user interface window 304 may include an option 307 for enabling a user to view a list of cast members associated with a particular show/television program.

For instance, FIG. 3B depicts an embodiment of a user interface 306 that displays a list of cast members 308 associated with a show/television program in response to receiving a user-selection of option 307. The cast members on the list of cast members 308 are individually selectable for enabling a user to retrieve additional information about a particular cast member. For example, in the depicted embodiment, cast member 310 is selected and additional information relating to cast member 310 may be requested.

FIG. 3C depicts an embodiment of a user interface 320 that displays biographical information about the selected cast member. In addition, in certain embodiments, user interface 308 may include a list of shows 322 that are associated with the selected cast member. The list of shows 322 may include television programs, movies, commercials, live performances, music videos, and any other entertainment platform that a cast member may be associated with. In one embodiment, one or more shows in the list of shows 322 are individually selectable by a user. For instance, in one embodiment, in response to receiving a selection of a show from the list of shows 322, a menu 324 may appear that presents a get additional information option 326, a video on demand option 328, and a purchase hard copy option 330. A user may request additional information pertaining to a show by selecting get additional information option 326, and/or request viewing of the show by selecting video on demand option 328, and/or order a hard copy, e.g., a DVD, of the show by selecting purchase hard copy option 330.

In addition, in some embodiments, user interface 320 may include information about upcoming releases associated with the selected cast member, e.g., a new movie corning to theaters and/or a movie being release on DVD. As will be further described in FIG. 4A, in certain embodiments, a user may select an upcoming release, such as, but not limited to, movie release 334 to retrieve additional information about the movie release (e.g., a description and/or viewer ratings) and/or a movie trailer associated with the release.

Additionally, in some embodiments, user interface 320 may include merchandise information 340 that presents one or more merchandise items, such as merchandise item 342 and 344 related to a cast member and/or a currently selected show. For example, while viewing a television program, a user may like an item seen on the show (e.g., a piece of clothing or furniture item) and request enhanced entertainment data associated with the show to gather additional information about the item and/or to see if the item is available for purchase. Merchandise information 340 may include other merchandise items, such as, but not limited to, perfumes, clothing, shoes, furniture, and/or jewelry associated with a selected cast member. In certain embodiments, in response to receiving a user-selection of a merchandise item, middleware device 200 may retrieve information about the selected merchandise item (e.g., a commercial, images, available sizes, etc.) from a local data storage unit and/or from one or more remote sources. In some embodiments, enhanced entertainment data module 230 includes executable instructions for enabling a user to purchase a selected merchandise item. In other embodiments, enhanced entertainment data module 230 may merely provide information about a particular item.

In some embodiments, user interface 320 may include an add to favorites option 350 for adding the selected cast member to a favorites list. In one embodiment, enhanced entertainment data module 230 utilizes the favorites list to monitor and search for television programs, product, movies, and/or any other related items that may be of interest to the user. In certain embodiments, enhanced entertainment data module 230 may dynamically generate an electronic programming guide containing shows related to cast members on a user's favorites list.

Figure 4A:
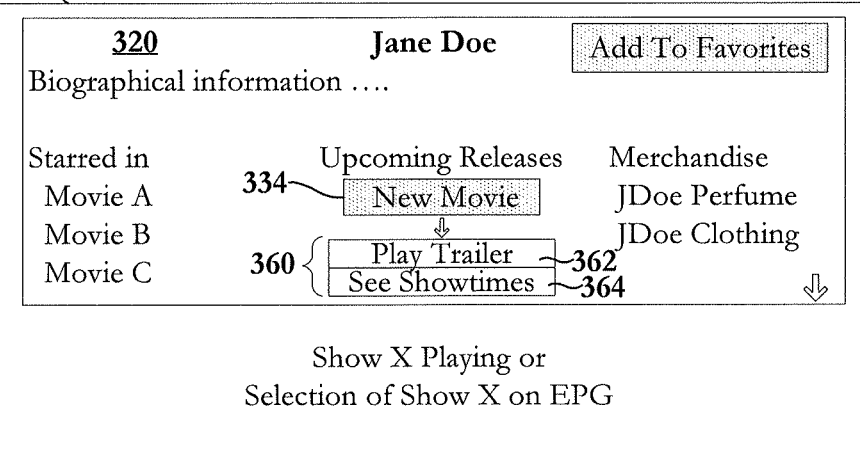
FIGS. 4A-4C illustrates an embodiment of a series of user interfaces for enabling a user to view and purchase items associated with a particular cast member in accordance with certain embodiments of the invention.
Figure 4B:
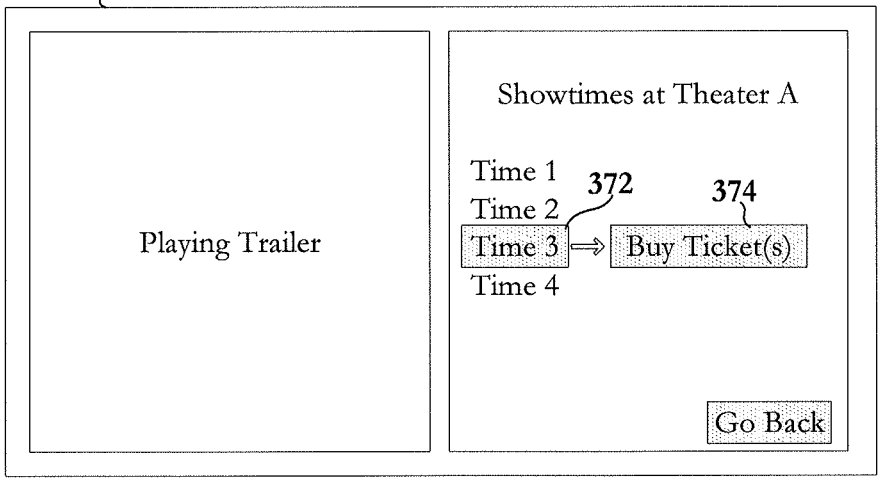
Figure 4C:
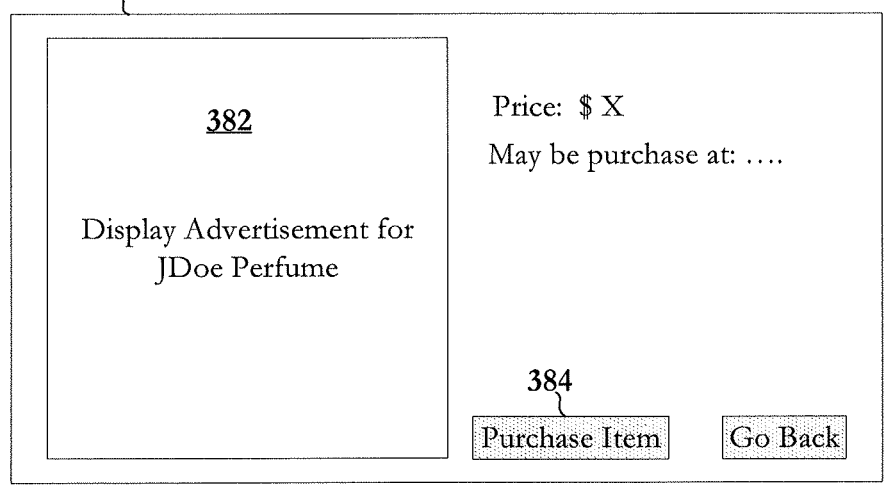

With reference now to FIGS. 4A-4C, an embodiment of a series of user interfaces for enabling a user to view and purchase items associated with a particular cast member and/or show is presented in accordance with certain of the disclosed embodiments. FIG. 4A depicts an embodiment in which middleware device 200 receives a user-selection of movie release 334 in user interface 320. In one embodiment, user interface 320 presents a selection menu 360 for enabling a user to request one or more actions associated with movie release 334. For example, in one embodiment, selection menu 360 may include, but is not limited to, a play movie trailer option 362 and a see movie show-times option 364. As stated above, in response to receiving a user-selection of play movie trailer option 362, middleware device 200 may retrieve a movie trailer for the selected movie from a local data storage unit and/or from one or more remote sources. In one embodiment, in response to receiving a user-selection of see movie show-times option 364, enhanced entertainment data module 230 automatically determines the location of the user (e.g., based on service address and/or based on a preset user configuration location setting) and determines the closest theater showing movie release 334. In other embodiments, middleware device 200 may display a list of theaters (not depicted) located near the user's location for enabling the user to select a particular theater. In response to a determination and/or a selection of a theater location, enhanced entertainment data module 230 retrieves and displays show-times associated with the selected show.

For example, FIG. 4B depicts an embodiment in which middleware device 200 may display a movie trailer associated with movie release 334 and show-times for movie release 334 at a particular theater location in a split screen interface 370. In addition, in certain embodiments, enhanced entertainment data module 230 may enable a user to select a particular show-time, e.g., show-time 372, and purchase tickets for the selected show-time using purchase option 374. In one embodiment, enhanced entertainment data module 230 transmits the purchase request to one or more remote sources, e.g., a third party provider, such as, but not limited to, www-.Fandango.com™, for facilitating the purchase request. In certain embodiments, a user may provide a credit card number and/or may utilize a stored credit card for purchasing the tickets. In one embodiment, the user receives the tickets at the theater location by presenting the credit card used to purchase the tickets.

With reference to FIG. 4C, a user interface 380 is depicted that presents additional information about a selected merchandise such as merchandise item 342. In one embodiment, user interface 380 displays an advertisement for merchandise item 342 (e.g., a commercial and/or an image) in display area 382. In addition, in some embodiments, user interface 380 may display other information associated with merchandise item 342, such as, but not limited to, a price and/or one or more locations at which merchandise item 342 may be locally purchased. In certain embodiments, user interface 380 may include a purchase merchandise option 384 for enabling a user to purchase merchandise item 342 and have the item automatically delivered to the user's service address and/or any other address designated by the user. The cost of the item may be billed to the user separately, as part of the user's monthly service charges, and/or to a credit card associated with the user.

Figure 5:
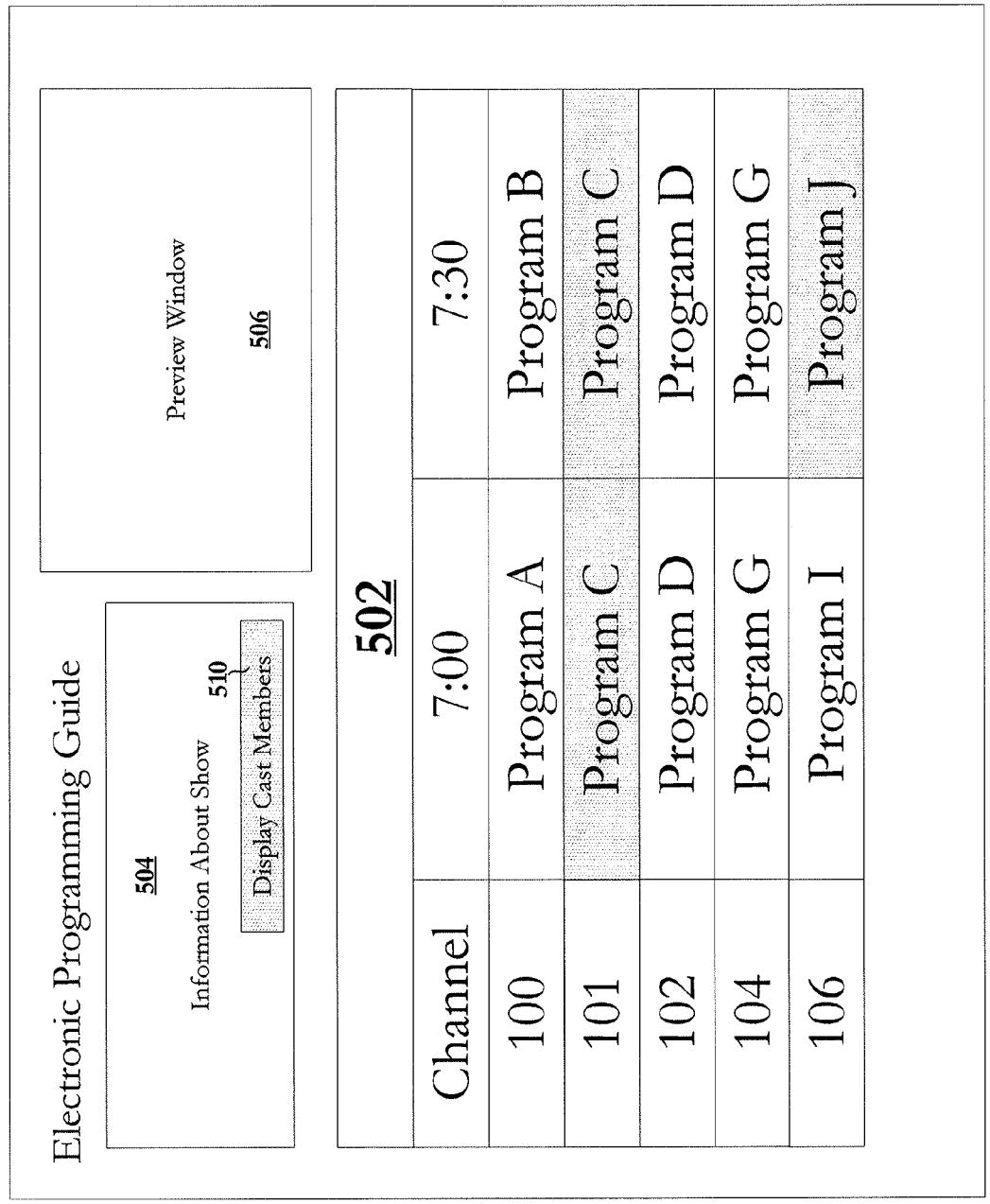
FIG. 5 illustrates an embodiment of an electronic programming guide for enabling a user to retrieve enhanced entertainment data about a television program in accordance with certain embodiments of the invention.

FIG. 5 illustrates an embodiment of a user interface 500 for enabling a user to retrieve enhanced entertainment data about a television program in accordance with certain embodiments of the invention. In the depicted embodiment, user interface 500 includes an electronic programming guide 502, an information display area 504, and a preview window 506. In one embodiment, electronic programming guide 502 highlights one or more shows that enhanced entertainment data module 230 identifies as matching one or more cast members identified by the user as being a favorite. For instance, in the depicted embodiment, "program C" and "program J" are identified as matching one or more favorite cast members identified by the user. In accordance with one embodiment, user interface 500 may include a display cast member options 510 for enabling a user to retrieve additional information about a particular show including, but not limited to, a list of the cast members associated with the particular show. As described above, in certain embodiments, the list of cast members may include individually selectable cast members for retrieving additional enhanced entertainment data about the selected cast member.

Figure 6:
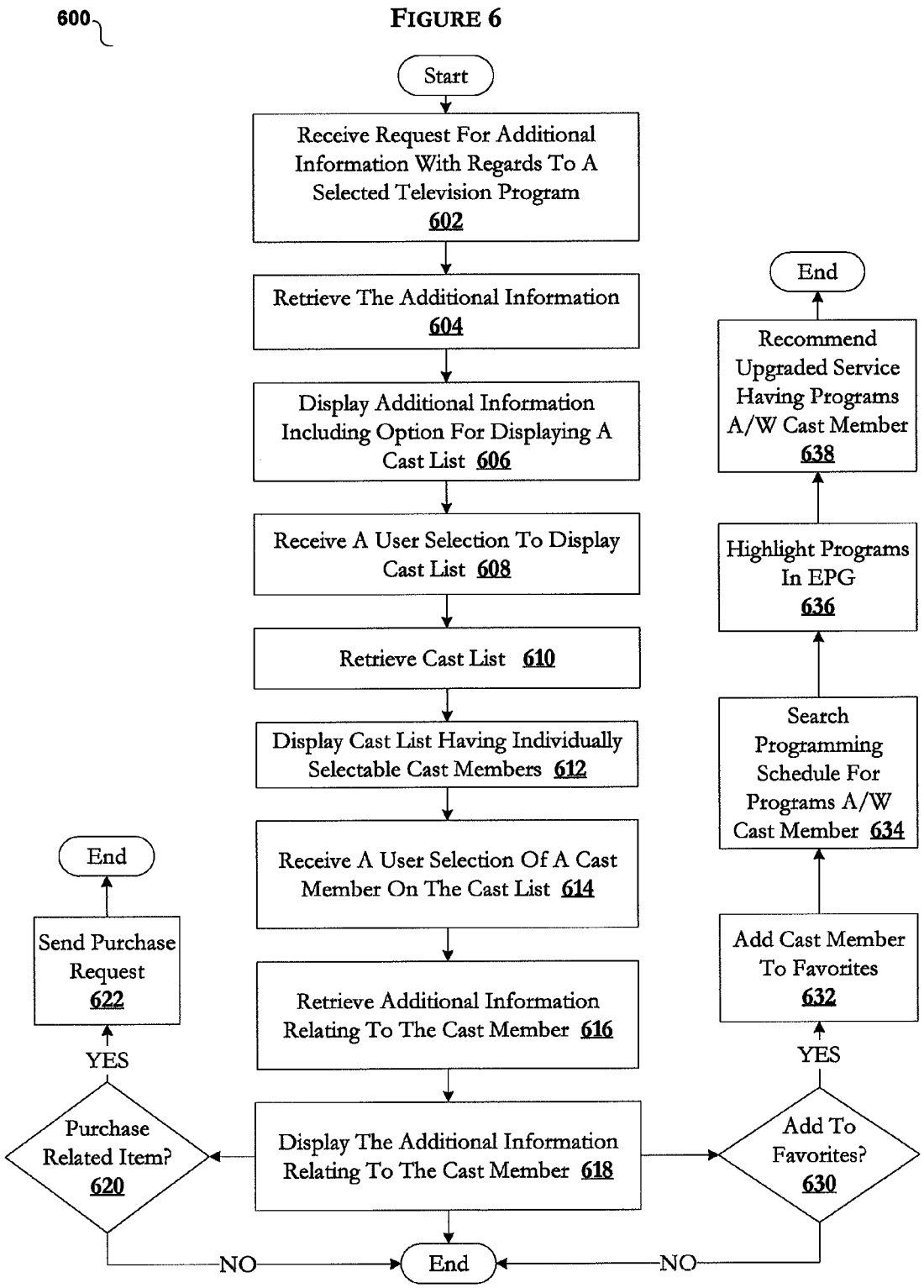
FIG. 6 illustrates an embodiment of a process for providing enhanced entertainment data in accordance with certain embodiments of the invention.

FIG. 6 illustrates an embodiment of a process 600 for providing enhanced entertainment data in accordance with certain embodiments of the invention. In the depicted embodiment, process 600 begins by receiving a request for additional information about a selected television program at step 602. The process retrieves the additional information from one or more local and/or remote source(s) at step 604. The process displays the retrieved information at step 606. In one embodiment, the additional information includes an option for displaying a cast list associated with the selected television program. In response to receiving a user-selection to display the cast list associated with the selected television program at step 608, the process retrieves the cast list at step 610. The process displays the cast list at step 612. In accordance with certain of the disclosed embodiments, the cast list includes individually selected cast members. If the process receives a user-selection of a cast member on the cast list at step 614, the process retrieves additional information relating to the cast member at step 616, and displays the additional information relating to the cast member at step 618.

In one embodiment, process 600 may enable a user to add the selected cast member a favorites list at step 632. In some embodiments, in response to adding the selected cast member a favorites list, the process searches a programming schedule for shows associated with the selected cast member at step 634. In one embodiment, the process tags/highlights any show identified as associated with the selected cast member in the electronic programming guide. In some embodiments, if the process identifies a show associated with the selected cast member on a channel that the user does not subscribe to, the process may present an option for the user to upgrade his service to include the missing channel at step 638, and/or to request the show as a video on demand option.

Alternatively and/or in addition to, in some embodiments, process 600 may enable a user to view and purchase merchandise associated with a selected cast member and/or show as described above. If the process receives a request to purchase a selected item at step 620, the process transmits the purchase request to the appropriate source(s) for facilitating the purchase request, with process 600 terminating thereafter.

The above disclosure describes several embodiments including a system and method for providing enhanced entertainment data about a television program and/or cast member to a user via a middleware device. For example, in one embodiment, a computer implemented method for providing enhanced entertainment data is disclosed. The method includes receiving, at a set top box, a request for additional information about a selected television program. The method displays additional information that includes a cast list of the selected television program. In one embodiment, the cast members on the cast list are individually selectable; and responsive to receiving a user selection of a cast member on the cast list, the method displays additional information relating to the cast member. In some embodiments, the method enables the user to purchase items related to the cast member and/or show using the specially configured set top box.

The above disclosure merely describes certain embodiments of the claimed invention and is not intended to limit the scope of the claimed invention. In addition, the disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions, hardware components, and/or any combination thereof. In addition, the flowchart and block diagrams in the figures illustrate the architecture, functionality, and operation of possible implementations of systems, methods and computer program products according to various embodiments of the claimed invention. In this regard, each block in the flowchart or block diagrams may represent a module, segment, or portion of code, which may include one or more executable instructions for implementing the specified logical function(s). In some alternative implementations, the functions noted in the block may occur out of the order noted in the figures and/or may be omitted. In addition, two blocks shown in succession may, in fact, be executed substantially concurrently, or the blocks may sometimes be executed in the reverse order, depending upon the functionality involved.

Additionally, computer program instructions for executing the disclosed embodiments may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. In addition, as referenced herein, a module is defined as hardware, software, and/or a combination thereof for performing a particular function. Software is defined as computer executable instructions including, but not limited to, object code, assembly code, and machine code. Hardware may include, but is not limited to, one or more processors/microprocessors, electronic circuitry, and other physical components. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

We claim:

1. A method for providing enhanced entertainment data, the method comprising:
   receiving, at a set top box, a request for additional information related to a selected show, the additional information including a cast list of the selected show;
   receiving a selection, from a user, of a cast member from the cast list;

in response to the selection, adding the selected cast member to a favorites list;
searching for future scheduled shows with which the selected cast member is associated;
generating an electronic programming guide that identifies the future scheduled shows with which the selected cast member is associated;
displaying the electronic programming guide to a user;
responsive to identifying a show associated with the cast member on a channel that the user does not subscribe to, presenting an option for the user to upgrade the user's service to include the channel;
displaying a list of selectable merchandise associated with the selected show or with the selected cast member;
responsive to receiving a user selection of one of the selectable merchandise, presenting information related to a selected merchandise and an option for a user to purchase the selected merchandise;
retrieving a billing address associated with a subscriber account associated with the user in response to receiving a purchase request for the selected merchandise;
placing an order for the selected merchandise using the billing address; and
billing the order as part of a monthly service charge to the user.

2. The method of claim 1, further comprising receiving the request for additional information related to the selected show during displaying of the selected show.

3. The method of claim 1, further comprising receiving the request for additional information related to the selected show during displaying of an electronic programming guide.

4. The method of claim 1, further comprising retrieving the additional information related to the selected show from a data storage component of the set top box.

5. The method of claim 1, wherein the additional information relating to the selected show includes biographical information related to the selected cast member.

6. The method of claim 1, wherein the additional information relating to the selected show includes a list of shows that the selected cast member is associated with.

7. The method of claim 6, wherein shows on the list of shows are individually selectable, the method further comprising:
displaying information related to a show on the list of shows in response to receiving a user selection of the show.

8. The method of claim 6, further comprising displaying a trailer for a show in response to receiving a user selection of the show.

9. The method of claim 6, further comprising:
enabling a user to order a show from the list of shows using a video on demand feature;
transmitting a request for the show in response to receiving a user request for the show;
receiving the show at the set top box; and
displaying the show.

10. The method of claim 1, further comprising displaying locations where the user can purchase the selected merchandise.

11. A set top box comprising:
a communication interface for receiving media content from a content provider;
an input/output interface for distributing the media content to a display;
a memory component for storing computer executable instructions;
a processing unit for executing the computer executable instructions to:
receive a request for additional information related to a selected show, the additional information including a cast list of the selected show;
receive a selection, from a user, of a cast member from the cast list;
in response to the selection, add the selected cast member to a favorites list;
search for future scheduled shows with which the selected cast member is associated;
generate an electronic programming guide that identifies the future scheduled shows with which the selected cast member is associated;
display the electronic programming guide to a user;
responsive to identifying a show associated with the cast member on a channel that the user does not subscribe to, present an option for the user to upgrade the user's service to include the channel;
display a list of selectable merchandise associated with the selected show or with the selected cast member;
responsive to receiving a user selection of one of the selectable merchandise, present information related to a selected merchandise and an option for a user to purchase the selected merchandise;
retrieve a billing address associated with a subscriber account associated with the user in response to receiving a purchase request for the selected merchandise;
place an order for the selected merchandise using the billing address; and
bill the order as part of a monthly service charge to the user.

12. The set top box of claim 11, wherein the processing unit further executes the computer executable instructions to receive the request for additional information related to the selected show during displaying of the selected show.

13. The set top box of claim 11, wherein the processing unit further executes the computer executable instructions to receive the additional information related to the selected show from a data storage component of the set top box.

14. A non-transitory computer readable medium comprising computer executable instructions that when executed causes one or more machines to perform operations comprising:
receiving a request for additional information related to a selected show, the additional information including a cast list of the selected show;
receiving a selection, from a user, of a cast member from the cast list;
in response to the selection, adding the selected cast member to a favorites list;
searching for future scheduled shows with which the selected cast member is associated;
generating an electronic programming guide that identifies the future scheduled shows with which the selected cast member is associated;
displaying the electronic programming guide to a user;
responsive to identifying a show associated with the cast member on a channel that the user does not subscribe to, presenting an option for the user to upgrade the user's service to include the channel;
displaying a list of selectable merchandise associated with the selected show or with the selected cast member;
responsive to receiving a user selection of one of the selectable merchandise, presenting information related to a selected merchandise and an option for a user to purchase the selected merchandise;

retrieving a billing address associated with a subscriber account associated with the user in response to receiving a purchase request for the selected merchandise;

placing an order for the selected merchandise using the billing address; and billing the order as part of a monthly service charge to the user.

15. The computer readable medium of claim 14, further comprising computer executable instructions that when executed causes the one or more machines to retrieve the additional information related to the selected show from a data storage component of a set top box.

* * * * *